United States Patent Office 3,794,598
Patented Feb. 26, 1974

3,794,598
CATALYST PREPARATION METHOD
Walter G. Schlaffer, San Francisco, Calif., assignor to Shell Oil Company, Houston, Tex.
No Drawing. Filed June 21, 1972, Ser. No. 265,048
Int. Cl. B01j 11/40
U.S. Cl. 252—455 Z         9 Claims

ABSTRACT OF THE DISCLOSURE

A hydroconversion catalyst including a hydrogenating metal component having an atomic number between 20 and 32 incorporated into a crystalline alumino-silicate zeolite at least partially in hydrogen (acid) form in excess of the ion-exchange capacity of the zeolite is prepared in a single reaction step by removing sufficient hydrogen ions as generated during the ion-exchange reaction to incorporate the desired amount of hydrogenating component.

BACKGROUND OF THE INVENTION

Field of the invention

This invention relates to crystalline aluminosilicate zeolite hydrocarbon conversion catalysts and more particularly to such catalysts containing a relatively high proportion of catalytically active metals.

Prior art

Although catalytically active metals can be composited with crystalline aluminosilicate zeolites by conventional impregnation means, it is generally preferred to exchange cations of the catalytically active metal into the structure of the zeolite. The ion-exchange properties of zeolites are well known. The electrovalence of the aluminum in the structure is balanced by the inclusion of suitable cations in the crystal. The cation is most commonly an alkali metal, such as sodium, potassium or mixtures thereof. The cations of either the synthetic or naturally occurring materials can be exchanged for other mono- or polyvalent cations which are of a suitable physical size and configuration to diffuse through the intracrystalline passages in the aluminosilicate structure. The initial metallic cation can be replaced by another metallic cation, by a hydrogen ion or by an ammonium ion. In general, any suitable salt solution such as the sulfate, the nitrate and the like can be used as a source of cations to be exchanged into the zeolite.

The theoretical exchange capacity of the zeolite is represented by the number of equivalents of cations, e.g., sodium ions which balance the electrovalence of the aluminum ions. Obviously the exchange capacity varies according to the particular type of zeolite involved. In practice, not all of the cations in the aluminosilicate are readily replaced by the desired cations so that the effective exchange capacity is often somewhat less than the theoretical exchange capacity. The extent of the exchange depends on such factors as the type of cations present, zeolite cations to be exchanged, temperature of exchange, concentrations of various cations in the solution, ionic strength of the solution, and the like.

A method for incorporating catalytically active metals into zeolites in excess of the amount conventionally ion-exchanged by conducting the ion-exchange under certain conditions of pH, is described in U.S. Pat. 3,405,055. A common procedure for incorporating cationic metals into zeolite in excess of ion-exchange capacity involves four-one hour treatments of zeolite with boiling 1 M NH$_4$NO$_3$ with filtering and washing with boiling water between treatments in order to reduce the sodium content to a low level. The untreated powder is then dried at 120° C. and calcined at 550° C. to convert the ammonium form of zeolite to the acid form. The metals are then incorporated in four separate exchange steps by refluxing the calcined powder with a nickel acetate solution containing ammonium metatungstate, then filtering and washing with boiling water between refluxes until the filtrate is nickel free. The exchanged powder is then dried, formed into particles, e.g., by slugging or extruding, and calcined. In general, the pH of the exchange solution is in the range from about 6 to 12. The resulting catalyst has total cations (added catalytically active metal cations as well as residual initial cations) greater than the original cation equivalent of the aluminosilicate. However, the method requires several cation exchange steps to incorporate the desired amount of hydrogenation component into the support.

SUMMARY OF THE INVENTION

A method is provided for preparing a hydroconversion catalyst by incorporating into a zeolite in a single step an amount of hydrogenating component in excess of the conventional ion-exchange capacity of the zeolite. The method is applicable to hydrogenating components selected from the group consisting of metals having an atomic number from 20 to 32, inclusive. While ion-exchanging an aqueous solution of a salt of the hydrogenating component in cationic form with a zeolite at least partially in hydrogen (acid) form, the total cation equivalents of the hydrogenating component and residual exchange cations incorporated into the zeolite can be increased beyond the exchange cation equivalents in the original zeolite, as determined by the aluminum ion content of the zeolite, by neutralizing with a carbonate salt of the hydrogenating component or removing from said solution by distillation a sufficient quantity of hydrogen ions generated in the ion-exchange reaction to incorporate the desired amount of hydrogenating component into the zeolite.

DETAILED DESCRIPTION OF THE INVENTION

The method of the invention is broadly applicable to catalyst supports having exchangeable protons, e.g., amorphous supports such as alumina, silica-alumina, silica-boria, silica-magnesia, etc., as well as to the various crystalline alumino-silicate zeolites. However, it is most advantageously applied to zeolites, since catalysts prepared from these supports have greater activity when large amounts of catalytically active metals (in excess of the zeolite ion-exchange capacity) are incorporated into the zeolite by reaction rather than solely by physical impregnation (see e.g., U.S. 3,405,055).

Various crystalline aluminosilicate zeolites at least partially in hydrogen (acid) form can be used. Those having a silica/alumina ratio above about 2.5 and a pore size above about 5 angstroms (A.) are preferred.

Catalytically active metals particularly adaptable for use in the present invention are those of the fourth period of the Periodic Table, and particularly the transition metals having atomic numbers from 20 to 32, inclusive, such as titanium, vanadium, chromium, iron group metals, copper, zinc and the like. The iron group metals (iron, nickel and cobalt) are preferred. When these metals are ion-exchanged into a crystalline aluminosilicate in a normal manner, the resulting catalyst contains a relatively small amount of metal expressed as percent by weight of the catalyst. In the present invention, relatively large amounts of these metals, even in excess of the exchange capacity of the aluminosilicate, are incorporated into the zeolite to provide a highly active catalyst. On the other hand, heavier metals such as the platinum group metals, which are particularly active metals and are widely used in zeolite catalysts, have high atomic weights and can be conventionally ion-exchanged into the zeolites in quite large amounts. For example, platinum can be exchanged into a zeolite to provide as much as up to 30% wt. platinum in the finished catalyst. These metals are quite expensive and are generally used in much smaller amounts, i.e., about 1% wt., quite below the effective exchange capacity of the zeolite. While the present method can be used to provide an excess of these heavy metals over the ion-exchange capacity of the zeolite, the total amount of heavy metal added would be quite large and tend to make the cost of the catalyst excessive. Thus, in practice, the present invention is better suited for the light catalytically active metals. Where large amounts of the light metals are used in combination with a small amount of heavy metals, the light metals can be incorporated into the catalyst in accordance with the present invention and the heavy metals can be incorporated by conventional ion-exchange or impregnation.

Certain preferred hydroconversion catalysts also contain molybdenum or tungsten in addition to one or more of the aforementioned transition metals. These metals, if desired can be applied to the support simultaneously with the transition metals by including them in the aqueous ion-exchange solution in anionic form, e.g., as a soluble molybdate or meta-tungstate, such as an ammonium salt.

By using the method of the invention light cationic metals can be ion-exchanged into a zeolite in excess of its cation exchange equivalent, as determined by the aluminium ion content of the zeolite, in a single reaction step. It is not essential to remove sodium or ammonium ions from the zeolite prior to exchange with a transition metal, since both forms of zeolite will contain some hydrogen ions. Also, since ammonium ions are generally easily exchanged by the transition metals an intermediate calcination step is not essential before starting the ion-exchange reaction. However, when ion-exchanging directly between a cationic salt solution and a sodium-containing or uncalcined ammonium-containing zeolite, the cationic salt ion-exchange solution would accumulate sodium or amonium ions, respectively, and would not be easily re-useable. Consequently, a decationized calcined zeolite is preferred. With a decationized calcined zeolite hydrogen ions accumulate in the ion-exchange solution much faster than with a sodium or ammonium zeolite, as shown by a lower pH of the exchange salt solution. At these lower pH values metal incorporation into the zeolite is reduced. By removing a sufficient quantity of hydrogen ions generated in reacting the transition metal hydrogenating component with the zeolite, the desired excess amount of hydrogenating component can be incorporated into the zeolite in a single reaction step. In addition, the transition metal ion-exchange solution can be re-used.

The ion-exchange reaction can be accomplished at temperatures ranging from ambient to well above the salt solution normal boiling point. The lower temperatures require longer reaction times while the higher temperatures require a pressured vessel, such as an autoclave, to avoid boiling off water from the solution. Preferably the temperature will range from about 80° C. to about 110° C.

Although several hydrogenating component salts such as nitrate, chloride, sulfate, etc., are suitable, the acetate salt is preferred because the ion-exchange solution has a generally higher pH with a weak acid salt. The pH of an aqueous nickel acetate solution drops from about 6 to about 4 during a single exchange treatment with hydrogen zeolite and a strong odor of acetic acid becomes prevalent. Upon treatment with a second portion of the solution, the pH only drops to about 4.5 with only a correspondingly small additional nickel uptake. Aqueous nickel nitrate solutions of the same molarity as nickel acetate have a pH of about 2.5 and exchange much less nickel than nickel acetate solutions having pH of about 6. The amount of transition metal cation exchanged in a single application with a given portion of a given solution can be increased by removing or binding the hydrogen ions generated in the exchange reaction. One method suitable for accomplishing this is to provide anions of a suitable weak and volatile acid and to remove the resulting acid as vapor; acetate and carbonate ions are useful. The oxides or hydroxides of some of the transition metals can also be used if they are at least partially soluble in the solution, i.e., if they have a finite solubility at a pH of 4–5.

Another method is to neutralize the hydrogen ions as they are formed by adding a carbonate salt to the ion-exchange solution. Ammonium carbonate can be used, but a carbonate of the transition metal being ion-exchanged into the zeolite as a hydrogenating component is preferred. The latter salt not only neutralizes the hydrogen ions released in the reaction, i.e., by forming $H_2CO_3$ and releasing $CO_2$, but also provides additional transitional metal ions which shift the equilibrium toward incorporating a larger quantity of hydrogenating component into the zeolite.

Since the transitional metal carbonates are only slightly soluble in water, the salt may be added to the ion-exchange solution as a slurry. The amount of carbonate salt in the solution or slurry will be varied according to the quantity of hydrogenating component desired in the zeolite and can be readily determined by experimentation. In general the total metal content should be sufficient to incorporate transitional metals beyond the ion-exchange capacity of the zeolite up to the maximum equilibrium concentration which can be achieved in a single exchange step.

For many hydroconversion reactions catalysts containing molybdenum or tungsten in addition to one or more of the transition metals referred to above are preferred. The second metal is suitably incorporated into the support simultaneously with the transition metals by including it in the aqueous ion-exchange solution in anionic form, e.g., as a molybdate or metatungstate, and preferably as an ammonium salt.

Catalysts containing a hydrogenation component incorporated into a zeolite support by the method of the invention are active conversion catalysts. They are highly suitable in hydroprocesses such as hydroisomerization of paraffins, hydrofining to remove sulfur, nitrogen, or oxygen, hydrocracking, and the like. In general, hydroprocessing reactions are carried out at about 400 to 900° F., about 100 to 3000 p.s.i.g., 0.1–10 liquid hourly space velocity, and $H_2$/oil mole ratios of about 1–50. Hydrocracking is generally carried out at a temperature of about 500° F. to 850° F., a hydrogen partial pressure of about 500 to 2000 p.s.i.a., a liquid hourly space velocity of about 0.2 to 5, and a hydrogen-to-oil mole ratio of about 5 to 50.

It is generally desirable to subject a hydrocracking feedstock to a suitable hydrofining treatment to convert organic sulfur, nitrogen and oxygen compounds to hydrogen sulfide, ammonia and water, respectively. These compounds may or may not be removed prior to the hydrocracking reaction. The high activity of catalysts prepared by the method of the invention usually permits effluent from a hydrofining operation to be charged directly into a hydrocracker without removing ammonia, water and the like.

The following examples illustrate the invention.

EXAMPLE I

This example illustrate the simultaneous incorporation of a multi-metal hydrogenating component from a common solution in a single step into a stabilized Y-type zeolite extrudate prepared with 20% wt. Bentolite-L clay as a binder. The clay is obtained from the Georgia Kaolin Research Laboratories, Elizabeth, N.J. In these cases, the amounts and concentrations of the solutions were chosen to give 16.8% wt. Ni and 1.7% wt. W based on the finished catalyst, or 20% wt. Ni and 2% wt. W based on the zeolite content. Two catalysts were prepared as indicated in Table I.

TABLE I 20 grams of extrudate, 140 ml. solution 1 M Ni $(OAc)_2$ plus 0.71% w. ammonium metatungstate (contains 8.2 g. Ni), 8.3 g. $NiCO_3$ (contains 3.8 Ni)

| Catalyst No. | Nickel solution | Conditions and remarks | Ni+W, percent w. estimated [a] | Analysis Ni | W |
|---|---|---|---|---|---|
| 1 | 1 M Ni(OAc)$_2$ [b] | 80° C.—6 hrs., washed with filtered supernatant solution. | 15.1 | 13.3 | 1.0 |
| 2 | 1 M Ni(OAc)$_2$+NiCO$_3$ [b] | ....do............ | 16.6 | 14.0 / 13.9 | 0.7 / 0.5 |

[a] From increase of extrudate weight assuming NiO and WO$_3$.
[b] Two-fold excess in Ni and 80% in W to give 16.8% w. Ni and 1.7% W on finished catalyst.

In Catalyst No. 1 a strong odor of acetic acid was evident in the exchange solution. The efficacy of $NiCO_3$ in removing hydrogen ions was indicated by a reduction of the acetic acid odor in Catalyst No. 2. The carbonate reaction was also shown by frothing of the solution due to release of $CO_2$. The Ni uptake was increased from 13.3% w. in Catalyst No. 1 to 14.0% w. in Catalyst No. 2. This is small due to the slow rate of Ni exchange with pre-formed zeolites.

The technique was only partially successful (see Table I) in that although the nickel loading was approximately that desired, the tungsten loading was considerably less. It should be noted that more concentrated solutions of nickel acetate are thermally unstable, but 1 M solutions are stable for at least six hours at the boiling point, 102° C. With ammonium metatungstate (ATM) present a precipitate forms even with the more dilute nickel acetate solutions and at 80° C. These observations plus an abnormally low tungsten content of the AMT used account for the low tungsten loading in that the tungsten is probably precipitated and is separated from the extrudate when the excess solution is removed.

EXAMPLE II

This example demonstrates the effect of time, temperature and number of treatments on the reaction of a cationic hydrogenation component with a zeolite. Several catalysts were prepared with a calcined decationized Davison ultrastabilized Y-zeolite powder. The results are listed in Table II.

TABLE II 20 grams of zeolite, 109 ml. of solution of indicated Ni(OAc)$_2$ molarity and containing 0.96% w. ammonium metatungstate

| Catalyst No. | Solution | Exchange No. | Hrs. | °C. | Filtrate, pH | Metal content, percent w. Ni | W |
|---|---|---|---|---|---|---|---|
| 3 | 0.8 M Ni(OAc)$_2$ [a] | 1 | 1 | 80 | 4.2 | 10.3 | 2.7 |
| 4 | 0.8 M Ni(OAc)$_2$ [a] | 1 | 1 | 102 | 4.1 | 13.5 | 2.3 |
| 5 | 0.8 M Ni(OAc)$_2$ [a] | 1 | 4 | 102 | 3.9 | 14.6 | 2.4 |
| 6 | 0.8 M Ni(OAc)$_2$ [a] | 1 | ½ | 102 | 4.1 | 12.4 | 2.6 |
| 7 | 0.8 M Ni(OAc)$_2$ [a] | [b]2 | 1 | 102 | 4.0 / 4.6 | 16.1 | 2.0 |
| 8 | 0.8 M Ni(OAc)$_2$ [a] | [c]2 | 1 | 102 | 4.0 / 4.6 | 16.2 | 2.2 |
| 9 | 1.6 M Ni(OAc)$_2$ [a,e] | 1 | 1 | 102 | 3.8 | 14.0 | 2.1 |
| 10 | 1.6 M Ni(OAc)$_2$ [d] | 1 | 1 | 102 | 4.2 | 16.6 | 2.6 |

[a] Amounts to 125% of that necessary for 20% Ni and contains ammonium metatungstate to give 2% w. tungsten on finished catalyst.
[b] Washed with boiling water between treatments. Second treatment without ammonium metatungstate.
[c] Not washed but only filtered between treatments. Second treatment without ammonium metatungstate.
[d] Twice the amount of Ni(OAc)$_2$ solution used for catalyst No. 9.
[e] 55 ml. of solution containing 1.92% w. ammonium metatungstate.

All three variables are important. Increasing the exchange temperature from 80° C. (Catalyst 3 exchange) to 102° C. (Catalyst 4) for a single treatment of one hour duration increased the nickel content from 10.3% wt., to 13.5% wt., a 30% increase. Treatment in excess of one hour at boiling temperature exchanges very little additional metal, the nickel exchanges for ½, 1 and 4 hours resulting in 12.4, 13.5 and 14.6% wt., for Catalysts 6, 4 and 5, respectively. A second treatment with fresh nickel acetate solution is much less efficient than the first, increasing the nickel loading only to 16.1% wt. (Catalyst No. 7) from 13.5% wt. (Catalyst No. 4) for the first treatment. Extensive washing of the catalyst with boiling water to remove the "spent" solution between treatments is not necessary. An experiment where the spent solution was merely separated from the catalyst before the second treatment gave the same nickel exchange as an exhaustively washed catalyst.

Doubling the nickel acetate concentration normally used at a constant ratio of nickel-to-zeolite had only a slight effect; nickel uptake increased from 13.5% wt. (Catalyst No. 4) to 14.0% wt. (Catalyst No. 9) in a single exchange. However, doubling the nickel-to-zeolite ratio gave a sizeable increase in the exchange to 16.6% wt. nickel (Catalyst No. 10) for a single exchange treatment.

EXAMPLE III

This example demonstrates the effect on metal incorporation of removing hydrogen ions generated when reacting a hydrogenating component with a zeolite. The zeolite used for these tests was the same as that used in Example II.

Two methods were used to remove hydrogen ions: (1) continuous removal of acetic acid during the exchange by distillation, with intermittent addition of water to maintain constant volume and (2) neutralization of the acetic acid by nickel carbonate in situ. All catalysts were given one ion-exchange treatment at 102° C. for the time indicated. The results are shown in Table III.

TABLE III 20 grams of zeolite, 109 ml. of solution of indicated Ni molarity and containing 0.96% w. ammonium metatungstate

| Cat. No. | Acid scavenger | Solution | Exchange time, hrs. | Filtrate, pH | Metal content, percent wt. | |
|---|---|---|---|---|---|---|
| | | | | | Ni | W |
| 11 | Continuous distillation of HOAc.[b] | 0.8 M Ni (OAc)$_2$ [a] | 1 | 4.3 | 15.4 | 2.0 |
| 12 | 4.45 grams NiCO$_3$ [c] | 0.8 M Ni (OAc)$_2$ [a] | 1 | 4.3 | 16.3 | 2.6 |
| 13 | 11.3 grams NiCO$_3$ [d] | 0.8 M Ni (OAc)$_2$ [a] | 1 | 4.9 | 21.6 | 1.7 |
| 14 | do.[d] | 0.8 M Ni (OAc)$_2$ [a] | 4 | 4.4 | 24.0 | 1.6 |
| 15 | 4.45 grams NiCO$_3$ [c] | 0.8 M Ni (NO$_3$)$_2$ | 1 | 3.1 | 21.1 | 3.2 |
| 15A | None | 0.8 M Ni (NO$_3$)$_2$ | 1 | 3.4 | 2.3 | |
| 16 | 11.3 grams NiCO$_3$ [d] | 0.8 M Ni (NO$_3$)$_2$ | 1 | 6.0 | 19.2 | 1.8 |
| | | | 1 | 5.8 | 20.8 | 1.9 |
| 17 | do.[d] | 0.8 M Ni (NO$_3$)$_2$ | 4 | 5.0 | 19.4 | 1.7 |

[a] Amounts to 125% of that necessary for 20% Ni and contains ammonium metatungstate to give 2% w. tungsten on finished catalyst.
[b] 0.5 eq. HOAc distilled per eq. Ni in system (HOAc=acetic acid).
[c] ½ the amount needed for 20% w. Ni on catalyst.
[d] Amount needed for 20% w. Ni on catalyst.

Continuous distillation, which removed 0.5 equivalent of acetic acid per equivalent of nickel in the system, only raised the pH to 4.3, indicating that considerable acid was still present. Nevertheless, the nickel exchange increased to 15.4% wt. (Catalyst No. 11) from 13.5% wt. for the control case (Cat. No. 4, Example II). From the data, it would appear that faster removal of acetic acid by this method would further increase the pH, thereby increasing the nickel exchange further.

Addition of nickel carbonate to the nickel acetate solution is an effective way of neutralizing acetic acid generated by nickel exchange. Adding nickel carbonate to 0.8 M nickel acetate in an amount of half that needed for exchange to 20% wt. Ni on catalyst increased the nickel uptake in the one-hour boiling treatment to 16.3% wt. (Catalyst No. 12). The pH of the filtrate was 4.3, i.e., slightly higher than without carbonate, indicating that all of the carbonate had reacted. Solutions of nickel acetate maintain a pH of about 6 as long as a trace of carbonate is present. This is also true in the presence of zeolite. Upon disappearance of the carbonate, the pH will then decline and eventually reach some value between about 4 and 5.5 as established by the equilibrium value. Use of enough nickel carbonate for 20% nickel on catalyst increased nickel uptake to 21.6% w. (Catalyst No. 13) and produced a pH of 4.9 at the end of the one hour treatment. However, the exchange did not reach equilibrium, since treatment for an additional three hours dropped the pH further to 4.4 with nickel uptake increased to 24.0% wt.

The acid neutralization method can also be used with nickel nitrate as the exchange medium. In contrast to nickel acetate, neat 0.8 M nickel nitrate solutions are too acidic, about pH 2.5, to give appreciable exchange. With added nickel carbonate, the equilibrium pH increases to about 6. As shown in Table III, when using nickel carbonate corresponding to 10% wt. nickel on catalyst, total consumption of the carbonate was achieved; the pH of the filtrate fell to 3.1 and a metal loading of 21.1% wt. resulted in one hour. Note that only 2.3% w. Ni is incorporated under the same conditions when NiCO$_3$ is not used as a scavenger (Catalyst No. 15A). However when a stoichiometric amount of nickel carbonate was used, the pH was still at about 6 after one hour (Catalyst No. 16) and declined to 5 after four hours treatment (Catalyst No. 17). When compared to similar experiments with nickel acetate, it appears that the exchange with nickel nitrate is considerably slower.

EXAMPLE IV

This example compares the effectiveness of hydrocracking catalyst prepared by the method of the invention with a catalyst prepared by a multiple cation exchange method.

Davison ultrastabilized Y-zeolite powder was used as a hydrogenating metal component support in these tests.

Three of the four catalysts were prepared by a one-step exchange with nickel salts plus ammonium metatungstate. In two cases, runs A and B, the nickel was incorporated via acetate plus carbonate and in the third case, run C, via nitrate plus carbonate. The fourth catalyst (Catalyst No. 21) was prepared by a multiple-step exchange with nickel acetate plus ammonium metatungstate, using a method similar to that illustrated in U.S. Pat. No. 3,405,055.

These catalysts were tested in a once-through second-stage hydrocracking of catalytically cracked heavy gas oil containing 4.2 p.p.m. nitrogen and 5000 p.p.m. sulfur at 1500 p.s.i.g., 10 H$_2$/feed mole ratio, at space velocities from 2 to 4, and with temperatures adjusted to achieve 67% w. conversion (<199° C.). Test results are given in Table IV.

TABLE IV

| | Run number | | | |
|---|---|---|---|---|
| | A | B | C | D |
| | Catalyst number | | | |
| | 18 | 19 | 20 | 21 |
| | Ni and W incorp. | | | |
| | Ni(OAc)$_2$ plus NiCO$_3$ plus AMT, boiling— | | Ni(NO$_3$)$_2$ plus NiCO$_3$ plus AMT, boiling, 4 hrs. | Ni(OAc)$_2$ plus AMT, boiling, 4×1 hr. |
| | 1 hr. | 4 hrs. | | |
| Percent weight: | | | | |
| Ni | 21.6 | 24.0 | 19.4 | 20 |
| W | 1.7 | 1.6 | 1.7 | 2.2 |
| Na | | | | 0.29 |
| Benzene sorption, percent wt. catalyst | 8.2 | 7.7 | 8.1 | 7.0 |
| 2 LHSV: | | | | |
| Temperature, ° C. | 349 | 342 | 350 | 348 |
| Decline, ° C./day | 0.13 | 0.23 | 0.31 | 0.19 |
| 3 LHSV: | | | | |
| Temperature, ° C. | 362 | 356 | 364 | 359 |
| Decline, ° C./day | 0.09 | 0.27 | 0.02 | 0.25 |
| 4 LHSV: | | | | |
| Temperature, ° C. | 374 | 369 | 377 | 371 |
| Decline, ° C./day | 0.23 | 0.63 | 0.32 | 0.53 |

[a] AMT=Ammonium metatungstate.

Catalysts 18, 19 and 20 prepared from the one-step exchanges are approximately as active and stable as catalyst 21 prepared by a four-step exchange procedure. All of these catalysts are more active and stable in a hydrocracking process than catalysts having comparable hydrogenating component contents, but incorporated into the zeolite support by impregnation.

EXAMPLE V

This example illustrates the broad applicability of the method to various hydrogenating metals and zeolite supports and demonstrates the improvement which results when the acid formed during ion-exchange is removed from the exchange solution.

(A) A series of catalysts was prepared using aluminum exchanged Y-zeolite as a support. Each preparation included 7.5 grams of zeolite. Each zeolite was contacted with 0.5 molar aqueous salt solution containing sufficient hydrogenating metal component to impart at least 20% wt. metal to the zeolite support. A fresh solution was employed for each exchange. All ion-exchanges were conducted at boiling temperature. Where several ion-exchange steps were employed (prior art method) each catalyst was washed with 75 ml. of boiling water between exchanges.

Where no acid scavenger was used each zeolite was ion-exchanged four times for one hour each. When a carbonate salt of the hydrogenating metal was used as an acid scavenger each zeolite was ion-exchanged only once for four hours. Those solutions employing a metal carbonate as an acid scavenger contained about twice the amount of hydrogenating metal component desired to be incorporated in the catalyst (about 20% w.). Where no acid scavenger was used, the total solutions employed in multiple exchanges contained this much hydrogenating metal component or more. After the final wash the catalysts were dried and analyzed for hydrogenating metals content. The results are shown in Table V(A) below.

(B) Another series of catalysts was prepared using a hydrogen form of mordenite, as a support, which was obtained by calcining an ammonium exchanged Zeolon (from Norton Co.) for 2 hours at 550° C. Ten grams of support were used for each preparation. Each of the ion-exchange solutions used was 0.5 M with respect to the salt used and contained sufficient hydrogenating metal component to deposit at least 11% wt. metal on the support. Boiling temperatures were employed for the ion-exchanges. Where more than one ion-exchange was employed the catalyst was washed with 100 cc. of water between exchanges. Where a metal carbonate was employed as an acid scavenger, the hydrogenating metal content of the solution was about double that desired to be incorporated in the catalyst (about 11% w.). Where no acid scavenger was employed, the total solutions used in multiple exchanges contained this much hydrogenating metal component or more. After a final wash with boiling water until the water was cation-free, the catalysts were dried and analyzed for hydrogenating metals content. The results are shown in Table V(B) below.

It is apparent from the above data that where no acid scavenger is used a larger quantity of hydrogenating metal can be ion-exchanged into a zeolite from an acetate solution than from a nitrate solution. However, when an acid scavenger is used, and particularly a carbonate of the desired hydrogenating metal component, much larger quantities of hydrogenating metal can be incorporated into the zeolite in a single exchange. In addition to the catalysts shown in Table V catalysts were prepared by the method of the invention using hydrogen Y-zeolite, Davison ultrastabilized Y-zeolite, sodium Zeolon, amorphous alumina and amorphous silica as supports. Increased metal loadings were obtained similar to those shown in Table V.

What is claimed is:

1. A method of preparing a hydroconversion catalyst having a hydrogenating component selected from the group consisting of metals having an atomic number from 20 to 32, inclusive, incorporated into a crystalline aluminosilicate zeolite by ion-exchange in excess of the cation exchange equivalent of the zeolite, as determined by the aluminum ion content of said zeolite, which comprises ion-exchanging the zeolite with an aqueous acetate solution containing sufficient hydrogenating component to achieve the desired concentration in a single reaction step; removing from said solution by distillation, while adding water to maintain solution volume, a sufficient quantity of hydrogen ions generated in the ion-exchange reaction to incorporate the desired amount of said hydrogenating component into the zeolite; separating the exchanged zeolite from said solution and washing it to remove extraneous ions; and drying and calcining the catalyst.

2. The method of claim 1 wherein the hydrogenating component salt is an acetate.

3. The method of claim 1 wherein the hydrogenating component is an iron group metal.

4. The method of claim 1 wherein the hydrogenating component is cobalt or copper.

5. The method of claim 1 wherein the catalyst also includes a Group VI-B metal, said metal having been added to the zeolite from an aqueous anionic solution.

6. The method of claim 1 wherein the zeolite is synthetic Y-faujasite or mordenite, which has been ion-exchanged and calcined before reacting with the aqueous cationic salt solution.

7. A method of preparing a hydroconversion catalyst having a hydrogenating component selected from the group consisting of metals having an atomic number from 20 to 32, inclusive, incorporated into a crystalline aluminosilicate zeolite by ion-exchange in excess of the cation exchange equivalent of the zeolite, as determined by the aluminum ion content of said zeolite, which comprises

TABLE V

A. Aluminum-exchanged Y-zeolite support

| Catalyst No. | Solution | Acid scavenger | Exchange No. | Hrs. | Filtrate, pH | Metals, percent wt. |
|---|---|---|---|---|---|---|
| 22 | 30 ml. Ni(OAc)₂ | None | 4 | 1 | *4.2 | 18 Ni |
| 23 | 30 ml. Ni(NO₃)₂ | ----do---- | 4 | 1 | *3.5 | 2.4 Ni |
| 24 | 66 ml. Ni(OAc)₂ | 4.2 gram NiCO₃ | 1 | 4 | 4.8 | 30 Ni |
| 25 | 66 ml. Ni(NO₃)₂ | ----do---- | 1 | 4 | 4.9 | 28 Ni |
| 26 | 30 ml. Co(OAc)₂ | None | 4 | 1 | *4.5 | 12.4 Co |
| 27 | 66 ml. Co(NO₃)₂ | ----do---- | 4 | 1 | *4.1 | 4.8 Co |
| 28 | 66 ml. Co(OAc)₂ | 3.8 grams 2CoCO₃·3Co(OH)₂ | 1 | 4 | 5.1 | 29 Co |
| 29 | 66 ml. Co(NO₃)₂ | ----do---- | 1 | 4 | 4.0 | 27 Co |
| 30 | 30 ml. Cu(OAc)₂ | None | 4 | 1 | 4.3 | 14.9 Cu |
| 31 | 61 ml. Cu(NO₃)₂ | ----do---- | 4 | 1 | 3.5 | 5.9 Cu |
| 32 | 61 ml. Cu(OAc)₂ | 3.5 grams CuCO₃·Cu(OH)₂ | 1 | 4 | 4.5 | 27 Cu |
| 33 | 61 ml. Cu(NO₃)₂ | ----do---- | 1 | 4 | 3.7 | 27.8 Cu |

B. H-Zeolon support

| Catalyst No. | Solution | Acid scavenger | Exchange No. | Hrs. | Filtrate, pH | Metals, percent wt. |
|---|---|---|---|---|---|---|
| 34 | 40 ml. Ni(OAc)₂ | None | 4 | 1 | *4.4 | 4.3 Ni |
| 35 | 40 ml. Ni(NO₃)₂ | ----do---- | 4 | 1 | *1.5 | 1.0 Ni |
| 36 | 40 ml. Ni(OAc)₂ | 2.4 grams NiCO₃ | 1 | 4 | 4.9 | 9.5 Ni |
| 37 | 40 ml. Ni(NO₃)₂ | ----do---- | 1 | 4 | 6.0 | 9.1 Ni |
| 38 | 37 ml. Cu(OAc)₂ | None | 4 | 1 | *4.1 | 7.4 Cu |
| 39 | 37 ml. Cu(NO₃)₂ | ----do---- | 4 | 1 | *1.2 | 1.8 Cu |
| 40 | 37 ml. Cu(OAc)₂ | 2.1 grams CuCO₃·Cu(OH)₂ | 1 | 4 | 4.2 | 13.2 Cu |

\* 1st exchange filtrate.